(No Model.)
F. J. HOLLIS.
COMBINED SELF FEEDING COFFEE MILL AND STORAGE RECEPTACLE.
No. 473,394. Patented Apr. 19, 1892.
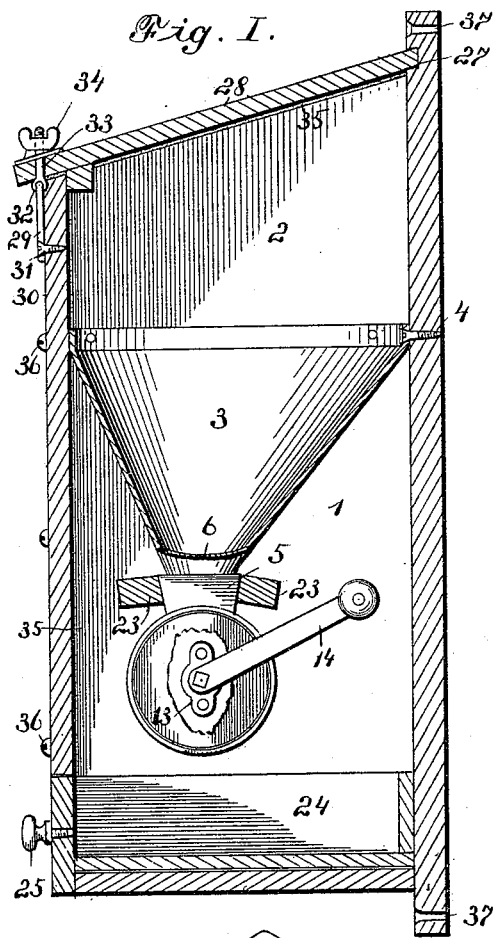
Fig. I.
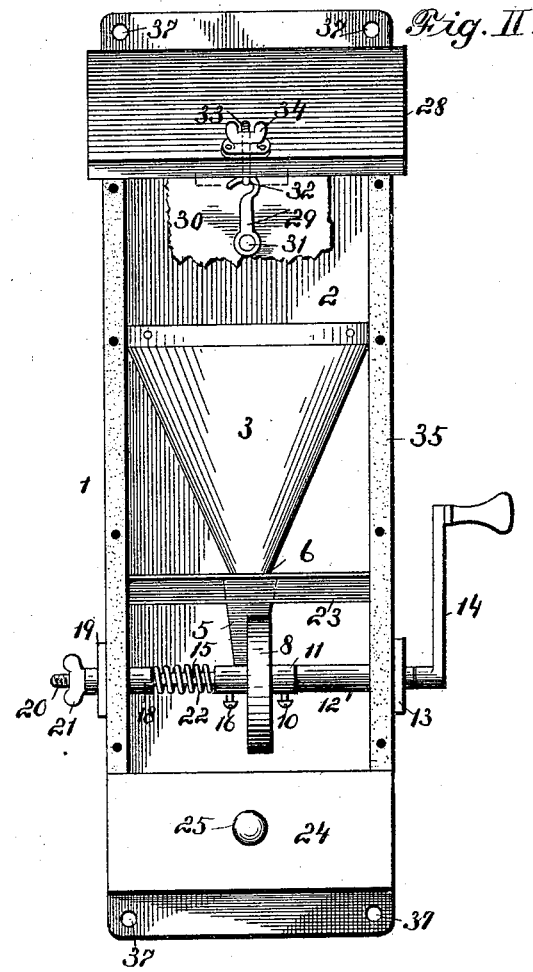
Fig. II.
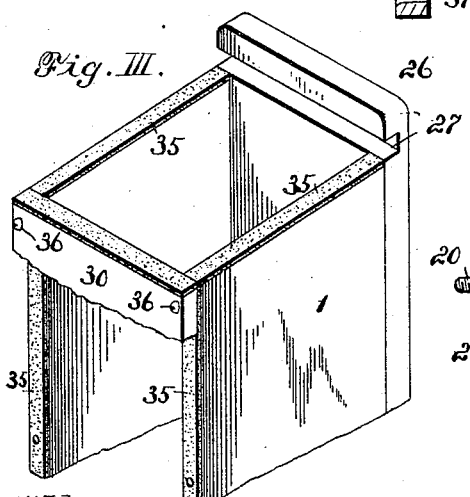
Fig. III.
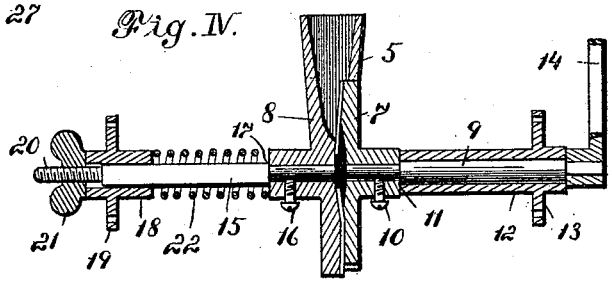
Fig. IV.
Witnesses:
F. G. Fischer
S. Cotton
Inventor:
F. J. Hollis.
By Wright Brown
Attys.

UNITED STATES PATENT OFFICE.

FRANK J. HOLLIS, OF KANSAS CITY, MISSOURI.

COMBINED SELF-FEEDING COFFEE-MILL AND STORAGE-RECEPTACLE.

SPECIFICATION forming part of Letters Patent No. 473,394, dated April 19, 1892.

Application filed July 2, 1891. Serial No. 398,285. (No model.)

*To all whom it may concern:*

Be it known that I, FRANK J. HOLLIS, of Kansas City, in the county of Jackson and State of Missouri, have invented certain new and useful Improvements in a Combined Self-Feeding Coffee-Mill and Storage-Receptacle, of which the following is a full, clear, and exact description, reference being had to the accompanying drawings, which form a part of this specification.

My invention relates to a certain new and useful device for grinding coffee and storing the same, whereby the coffee in the storage-receptacle is fed to the grinding device or mill by the force of gravity; and it consists in certain features of novelty hereinafter described, and pointed out in the claims.

Figure I is a vertical section of my improved device. Fig. II is a front elevation showing the front portion of the receptacle removed, in order that the operation of the device may be seen. Fig. III is a detail perspective showing the manner of securing the lid to the back of the receptacle and the felt strips against which the lid and the front portion of the receptacle are secured in order to make the same air-tight. Fig. IV is a section taken lengthwise of the grinding device, showing the means for holding and operating the same.

Referring to the drawings, 1 represents the coffee-holding receptacle in which the mill is located.

2 represents the storage-chamber, beneath which is secured a funnel 3, which meets the side and ends of the receptacle 1 and is secured thereto by screws 4 or by other suitable means. The lower end of the funnel 3 connects with the hopper 5 of the mill, as shown at 6, in order that the coffee may be discharged therein by the force of gravity.

7 8 represent the adjustable burrs or grinding-disks of the mill, the disk 7 being adjustably secured to a grinding-shaft 9 by means of a set-screw 10, said shaft 9 having a shoulder 11 thereon to prevent the disk from being slipped too far back on the shaft. The shaft 9 operates in a sleeve 12, which is secured to one side of the receptacle 1 by a flange 13, having suitable openings through which screws or rivets may be passed in order to engage the side of the receptacle.

14 represents a crank secured to the outer end of the shaft 9 in order to rotate the disk 7. The disk 8, which does not rotate, is integral or cast with the hopper 5 and is secured to the inner end of a shaft 15 by a set-screw 16, said shaft 15 also having a shoulder 17 to limit its inward movement in its connection with the grinding-disk 8. The opposite end of said shaft 15 passes through a sleeve 18, which is provided with a flange 19, secured to the side of the receptacle. The shaft 15 is provided with a threaded extension 20, on which works a thumb-screw 21, by which means the disk 8 may be moved laterally in order to grind the coffee in either a coarse or a fine condition, as may be desired.

22 represents a coil-spring on said shaft 15 for moving the disk 8 toward the disk 7, when by the action of the thumb-screw the shaft 15 is released. The disk 8 is held from rotating by strips 23, passing on either side of the hopper and secured to the side of the receptacle. (See Fig. 1.)

24 represents a drawer having a knob 25, the ground coffee being deposited in the drawer, which may be withdrawn at pleasure when it is desired to use some of the coffee.

The back portion of the receptacle 1 is provided with an extension 26, which extends somewhat higher than the balance of the receptacle and is provided with a groove 27, into which the rear end of a lid 28 is placed when it is desired to secure said lid in its position. The opposite end of said lid is held down in close contact with the top of the receptacle by means of a hook 29, pivoted to the front 30, as shown at 31, said hook engaging in an eye 32 on the lower end of a bolt 33, said bolt 33 passing through the front portion of the lid, having its upper end screw-threaded, and a thumb-screw 34 thereon, by which the tension on the lid may be increased and the same forced down in close contact with the top of the receptacle.

In order to make the receptacle air-tight, and thus prevent the aroma and strength of the coffee from escaping, I have provided the upper and front edges of the receptacle with listing or felt strips, as shown at 35, against which the lid 28 is secured by the means described, and against which the front 30 is secured by means of screws 36.

37 represents openings in the back portion of the receptacle, through which screws or nails may be inserted in order to secure the same to the wall or other support.

By the use of my device I can place any desired quantity of coffee in the chamber 2 and funnel 3, and then secure the lid 28, making the receptacle air-tight and preventing the aroma of the coffee or the strength of the same from deteriorating, the lid being left in place until all the coffee in the receptacle has been used. It will of course be understood that only a sufficient quantity of coffee will be ground at any one time to meet the necessary demand.

I claim as my invention—

1. In a coffee-mill and storage-receptacle, the combination of the holding-receptacle having the upward rear extension and the end with its rear edge engaging a groove in said extension and its front edge held upon the upper front edge of said receptacle by an eye-bolt depending from said lid and engaged by a hook on said receptacle, the grinding device and funnel arranged between said receptacle and grinding device, substantially as set forth.

2. In a coffee-mill, the grinding device consisting of the stationary disk held upon a shaft arranged within a sleeve held to the receptacle and a spring interposed between said disk and sleeve, and a nut engaging a screw-threaded end of said shaft, and a rotatable disk held upon a shaft inclosed by a sleeve secured to the receptacle and actuated by a handle, substantially as set forth.

FRANK J. HOLLIS.

Witnesses:
JAS. E. KNIGHT,
F. E. MULLETT.